No. 679,968. Patented Aug. 6, 1901.
H. INMAN.
WEIGHING AND FILLING MACHINE.
(Application filed July 24, 1900.)

(No Model.) 3 Sheets—Sheet 2.

Fig. 2

Witnesses
J. G. Hinkel
Hon. Gillman, Jr.

Inventor
Horace Inman
By Foster & Freeman
Attorneys

THE NORRIS PETERS CO., PHOTO-LITHO., WASHINGTON, D. C.

UNITED STATES PATENT OFFICE.

HORACE INMAN, OF AMSTERDAM, NEW YORK.

WEIGHING AND FILLING MACHINE.

SPECIFICATION forming part of Letters Patent No. 679,968, dated August 6, 1901.

Application filed July 24, 1900. Serial No. 24,700. (No model.)

*To all whom it may concern:*

Be it known that I, HORACE INMAN, a citizen of the United States, residing at Amsterdam, in the county of Montgomery and State of New York, have invented certain new and useful Improvements in Weighing and Filling Machines, of which the following is a specification.

My invention relates to apparatus for weighing and packing materials; and it consists in means for weighing out specific quantities of material and depositing the same in the receptacles, packages, bags, boxes, or cans required to be filled, as fully set forth hereinafter and as illustrated in the accompanying drawings, in which—

Figure 1:
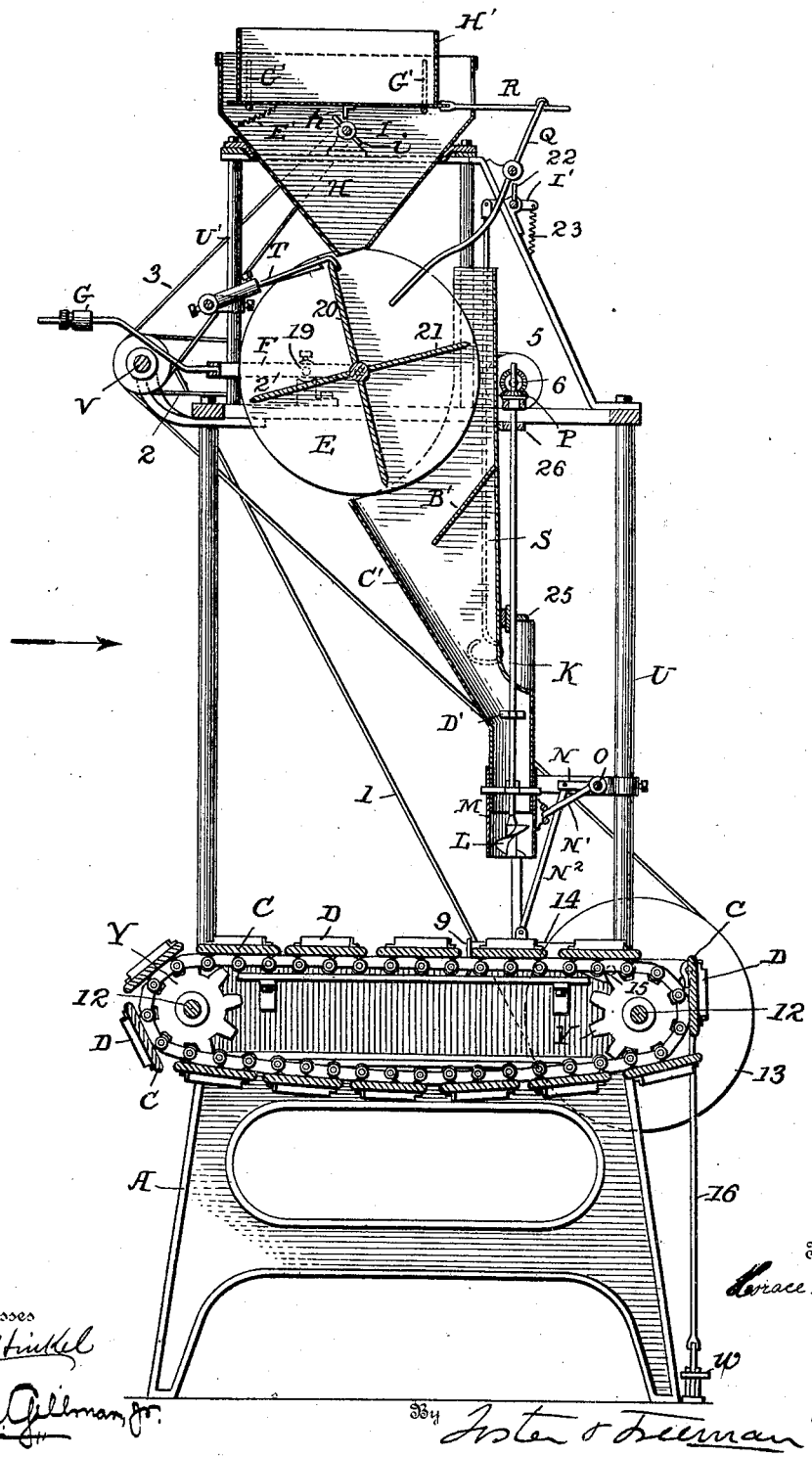
Figure 3:
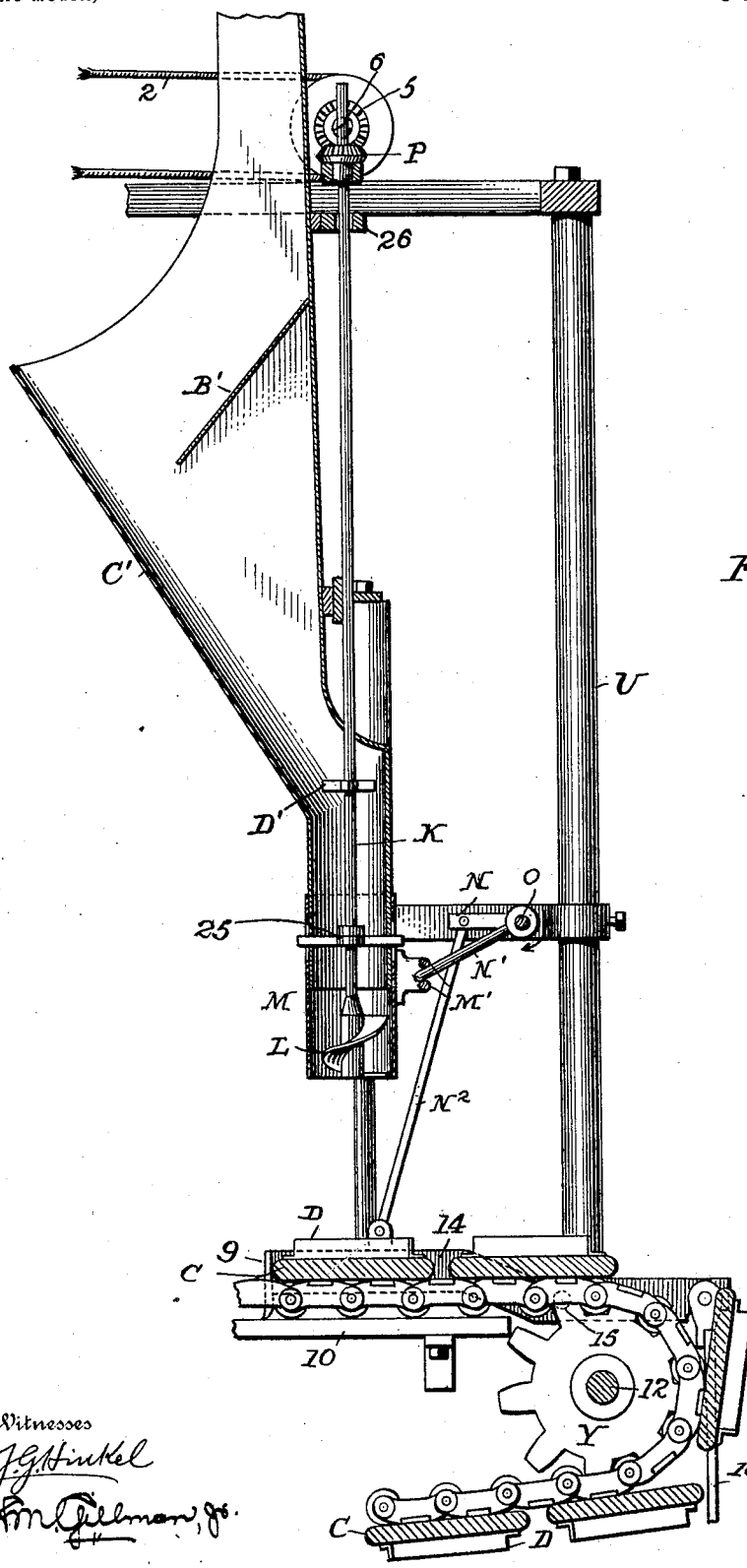

Figure 1 is a sectional elevation of an apparatus embodying my invention. Fig. 2 is an elevation looking in the direction of the arrow, Fig. 1; and Fig. 3 is an enlarged detail view of the feeding devices.

The base A of the frame supports uprights U, above which are other uprights U', and these parts support, respectively, the traveling bed for holding the receptacles into which the material is to be placed after being weighed, the appliances for weighing and discharging the material, the hopper, and devices for conducting the material to the weighing appliances, and where the material is required to be packed in the receptacles devices for this purpose are supported above the traveling bed. These parts may all be differently constructed and arranged according to the character of the material to be weighed and the kind of receptacles to be employed, as whether the latter shall be boxes, bags, or cans, &c. As shown, the traveling bed consists of a band or chain, a chain being shown supporting one or more series of blocks C, each of which is provided with a flange D, serving as a means of retaining the boxes or other receptacles which are placed within the said flanges on the blocks. There may be a single series of blocks C, or where, as shown, there is a plurality of weighing devices there will be a corresponding series of blocks, four being shown in the present instance.

The bed is fed intermittently to bring the receptacles below the mouth of a chute C' and there hold the same until the material is deposited therein, after which by a movement of the operator, who has meanwhile placed a series of empty boxes upon the next preceding supporting-block, the bed can move forward a step, bringing the latter receptacles beneath the chute. Different means for imparting this feeding movement may be provided. As shown, the shaft 12 carries the sprocket-wheels Y, supporting the endless chain at one end of the frame, and also carries a grooved pulley 13, to which passes a belt 1 from a pulley upon the main driving-shaft V. The pulley 13 is not fixed to the shaft 12, but moves frictionally thereon, so that the pulley will turn upon the said shaft when the latter is arrested. Any suitable means for arresting the shaft at intervals may be employed. As shown, an arm 14 is pivoted to the frame at 15 and is connected by a rod 16 with a treadle $w$, and at the end of the arm 14 is a finger 9, which when the arm 14 is lowered engages with a stop upon the traveling bed and arrests the movement of the latter with one of the blocks C beneath the end of the chute. The operator therefore by depressing the treadle can lift the finger 9 and permit the traveling bed to move forward, and upon then releasing the treadle the finger will descend and make contact with the next stop upon the bed, when the next receptacle will be below the chute.

The weighing device consists of a receiver so supported as to be movable vertically, being lifted by a predetermined weight and lowered when the material deposited in the receiver overcomes this weight, or the material is so deposited as by its weight to tilt the receiver and discharge the latter. As shown, the receiver E is cylindrical, divided by cross-partitions 20 21 into pockets, and the journals of the receiver turn in bearings of a frame F, pivoted at 19 to the main frame and carrying an arm 2, upon which is an adjustable weight G, the position of which determines the amount of material to be weighed out. A detent T in the form of a pivoted arm is so arranged as to engage the edges of the partitions successively and hold the receiver with one of the partitions nearly vertical, so that the material deposited in the receiver shall be at one side of the axis, and therefore tend to rotate the receiver and discharge the contents. The said detent engages the receiver only when the latter is in its elevated position. When a sufficient amount of material has been deposited in one of the pockets to overcome the weight G, the receiver will descend out of contact with the detent T, and the weight of the material will then rotate the receiver and discharge the contents into the chute C', a deflector-blade B' tending to deflect and break up the material in its descent.

Different means may be employed for supplying the material to the receiver. As shown, I make use of a hopper H', with openings in the bottom or elsewhere, so arranged and of such size that the material will not pass through unless the hopper is agitated, so that the flow may be determined by agitating or arresting the movement of the hopper. As shown, the hopper hangs from suspended links G' G' within the chute H, and has a perforated bottom, and is reciprocated from any suitable source of power. In the construction shown there is a rotating shaft I, driven by a belt 3 from a pulley on the shaft B, and the shaft I has fingers $i$, which make contact with fingers $h$, projecting from the hopper, and throw the latter in one direction, while a spring E' carries it in the opposite direction. The hopper H is supported so that it may be lifted from its links G' G', and an arm R projects from one end through an opening in the chute H and extends over a lug upon an arm Q, pivoted to the frame and projecting into the receiver. As a result of this construction when the material has been deposited in one of the pockets of the receiver and the latter begins to turn the partition thereof will make contact with the arm Q and tilt the latter, so as to lift the arm R and hopper, carrying its fingers $h$ out of contact with those on the shaft I, so that the material may be no longer fed until the partition passes from contact with the end of the arm Q, when the next partition will be nearly in a vertical position and the feeding operation of the material may be resumed.

It is of course desirable to start the feeding operation at any time, and this may be done by means of a pull-rod S, hung from a lever I', having a finger 22 so arranged that when the rod S is pulled down the finger will make contact with the arm Q and bring the parts into position to start operations. A spring 23 carries the lever I' in an opposite direction.

Some materials are dry and granular and will feed and pack naturally into the receptacles without any pressure; but others are spongy or fibrous and require to be pressed into the receptacles, and for this purpose I make use of a presser-screw L, which is arranged at the bottom of the chute C' and which is driven from any suitable source of power, so as to press the material down into the receptacles. Preferably the presser-screw should rest by its weight (to which any additional weight may be added if necessary) and be capable of rising as the material is pressed. This result is secured by carrying the shaft K of the said screw through bearings 25 26, so that it will slide freely vertically, and by making the shaft angular, so as slide in but turn with a bevel-gear P, which is driven from a gear 5 on the shaft 6, driven by a chain 2 from a pulley on the shaft V. A star-wheel D' may be secured to the shaft K of the chute C' to aid in breaking up the material if there should be any lumps.

It is desirable in most instances to carry the end of the chute into the mouth of the receptacle to be filled. As the receptacles vary in height, this result can best be secured by providing the mouth of the chute with a sleeve M and with means for elevating the latter as the receptacles are carried beneath the chute and then lowering the sleeve. This may be done in connection with the starting movement of the traveling bed by a rock-shaft O, having an arm N', entering between pins M' on the sleeve M, and with an arm N, connected by a rod $N^2$ to the arm 14, so that when the latter is raised the shaft O will be turned in the direction of its arrow and the sleeve M will be raised during the time that the receptacle is passing toward the chute, and when the movement of the receptacle is arrested the sleeve M will descend.

While I have described the operation in connection with a single receiver, it will be seen that a plurality of such receivers may be arranged side by side to coact with the traveling bed, having a plurality of supports for the receptacles to be filled, and it will be seen that although each receptacle may discharge its contents as soon as the proper amount is deposited therein the operation of refilling the same cannot be resumed until the operator can start the feeding devices.

Without limiting myself to the precise construction and arrangement of parts shown and described, I claim as my invention—

1. The combination of the weighing devices, chute H, a hopper consisting of a pan having a perforated bottom and suspended within the chute to be vibrated horizontally, means for vibrating the hopper, and means for elevating the hopper in the chute to throw it out of connection with the vibrating means, substantially as set forth.

2. The combination of the weighing devices, chute H, a hopper consisting of a pan having a perforated bottom and suspended to be vibrated horizontally, means for vibrating the hopper, and means for shifting the hopper to position out of action with the vibrating means, substantially as set forth.

3. The combination of the rotary pocketed receiver, chute H, vibrating hopper H' having a perforated bottom, means for vibrating the hopper, and an arm Q in position to be shifted as the receiver rotates and connected to shift the hopper out of action with the vibrating means, substantially as set forth.

4. The combination with the hopper and means for feeding material, of a rotary pocketed receptacle E, a counterweighted frame supporting said receptacle, a detent for preventing the rotation of the receptacle while elevated, and an arm Q arranged to make contact with parts of the receptacle and connections whereby the feeding means are thrown out of action by the movement of said arm, substantially as set forth.

5. The combination with the independent feeding and weighing devices, of a continuous traveling bed and means for moving it, a series of chutes each provided with a movable sleeve M, and means for mechanically raising and lowering the said sleeves, substantially as set forth.

6. The combination with means for supporting a receptacle to be filled, of a receiver, means for supplying material thereto and discharging it therefrom, a chute between the receiver and receptacle, a presser-screw on a vertically-movable shaft in said chute and driving-gear through which said shaft slides, and means for rotating the said gear and shaft, substantially as set forth.

7. The combination with the means for weighing and feeding material, of a delivery-chute having a sleeve at the lower end, an endless band carrying supports for receptacles to be filled, and means for arresting the travel of the band when a support is beneath the chute and for simultaneously lowering the sleeve, substantially as set forth.

8. The combination with an intermittently-traveling supporting-bed, of a plurality of receivers, means for feeding material to and discharging regulated quantities from each, means for conducting the material discharged from each receiver toward the said bed, and means for simultaneously starting the feeding devices, substantially as set forth.

9. The combination with an intermittently-moving supporting-bed, of independent receivers for receiving and weighing material, means for arresting the feed to each receiver and discharging the latter when the proper quantity of material is deposited therein, and means for starting the feed of all the receivers simultaneously, substantially as set forth.

10. The combination with a traveling bed and means for moving the same intermittently, of a chute, means for feeding material thereto, and a sleeve M movable upon said chute and devices for moving said chute from said bed, substantially as set forth.

11. The combination with a traveling bed and means for moving the same intermittently, of a chute, means for feeding material thereto, a sleeve M movable upon said chute, and devices for stopping and starting the bed and simultaneously moving the said sleeve, substantially as set forth.

12. The combination of a receiver, means for supplying and discharging the same, a traveling bed for the receptacles, an intermediate chute provided with a deflector-blade B', and an agitator for breaking up the contents, substantially as set forth.

In testimony whereof I have signed my name to this specification in the presence of two subscribing witnesses.

HORACE INMAN.

Witnesses:
 H. D. JAMESON,
 F. L. RAND.